United States Patent [19]
Suzuki et al.

[11] Patent Number: 5,517,363
[45] Date of Patent: May 14, 1996

[54] TRIPLE ENGAGEMENT OPTICAL ELEMENT HOLDER

[75] Inventors: Noboru Suzuki; Mitsuyasu Sho, both of Hidaka, Japan

[73] Assignee: Sigma Koki Co., Ltd., Saitama, Japan

[21] Appl. No.: 393,474

[22] Filed: Feb. 24, 1995

[30] Foreign Application Priority Data

Feb. 28, 1994 [JP] Japan .................................. 6-029626

[51] Int. Cl.⁶ ..................................................... G02B 7/02
[52] U.S. Cl. ............................................. 359/819; 359/827
[58] Field of Search ..................................... 359/819, 820, 359/822, 823, 827, 507, 892; 354/286; 362/455, 456

[56] References Cited

U.S. PATENT DOCUMENTS

| | | | |
|---|---|---|---|
| 2,937,571 | 5/1960 | Thompson | 359/819 |
| 4,408,830 | 10/1983 | Wutherich | 359/819 |
| 4,929,054 | 5/1990 | Ahmad | 359/819 |
| 5,053,794 | 10/1991 | Benz | 359/819 |
| 5,220,460 | 6/1993 | Bedzyk | 359/819 |

FOREIGN PATENT DOCUMENTS

147413  12/1985  Japan .................................. 359/819

*Primary Examiner*—Georgia Y. Epps
*Assistant Examiner*—Ricky Mack
*Attorney, Agent, or Firm*—Oliff & Berridge

[57] ABSTRACT

An optical element holder holds an optical element while minimizing the profile irregularity of the optical element. The optical element holder is provided with three holding portions which abut and engage the peripheral side surface of the optical element at first, second and third positions, respectively. One of the holding portions is movable and can be moved to and away from the peripheral side surface of the optical element, thereby securing the optical element in the optical element holder and releasing the optical element from the optical element holder, respectively.

3 Claims, 6 Drawing Sheets

PRIOR ART

TRIPLE ENGAGEMENT OPTICAL ELEMENT HOLDER

BACKGROUND OF THE INVENTION

1. Field of The Invention

This invention relates to an improved optical-element holder, to which an optical element can be easily attached, and from which the optical element can be easily detached, with maintaining the profile irregularity of the optical element small (thus, with keeping the figure tolerance thereof fine).

2. Description of The Related Art

Generally, the following are known as means for holding or retaining an optical element.

Figure 9:
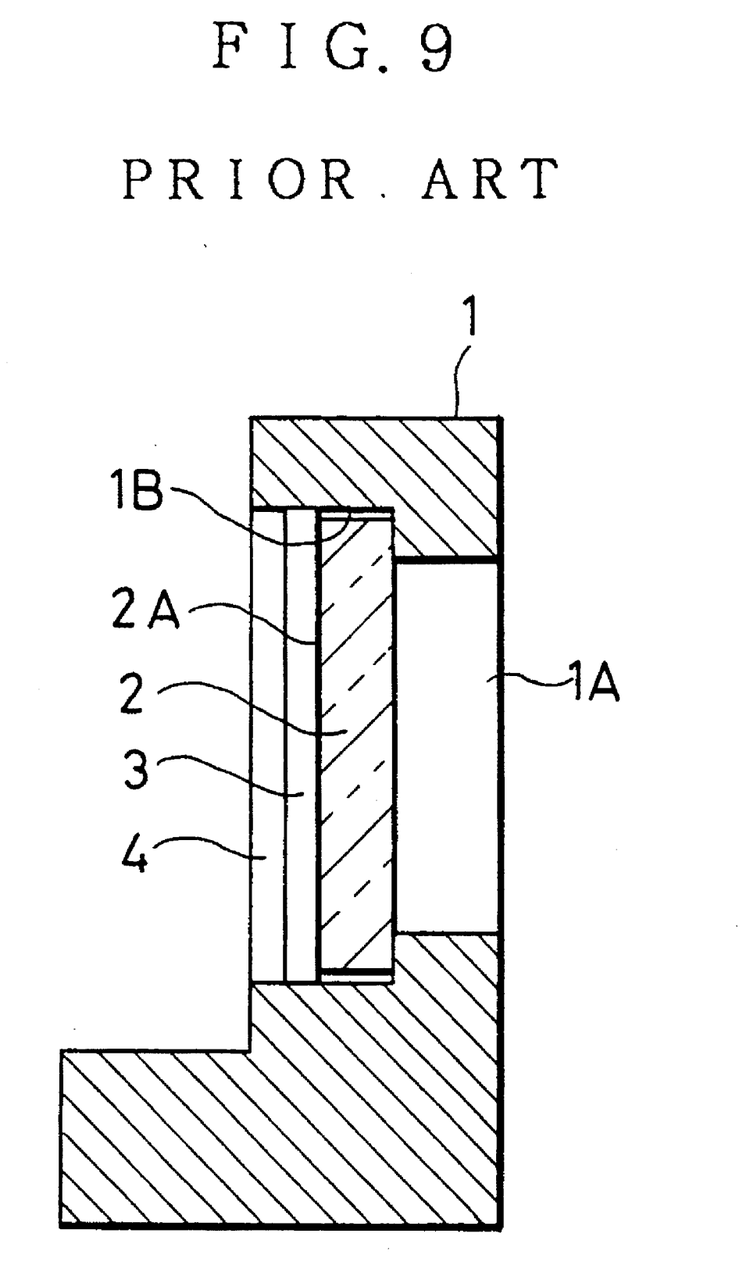
FIG. 9 is a sectional side view of a first example of a conventional optical element holder.

Referring first to FIG. 9, there is shown a first example of a conventional optical element holder. In this figure, reference numeral 1 designates the optical element holder. Further, in a through hole 1A bored through the optical element holder 1, an enlarged cylindrical hole 1B of a diameter larger than the diameter of the through hole 1A (hereunder referred to simply as a counterbored stage portion 1B) is formed at an end of the through hole 1A. An optical element 2 such as a resonator mirror and a lens or the like is fitted into the counterbored stage portion 1B and is then fixed thereto with a Delrin ring 3 ("Delrin" is a trade name of an acetal resin manufactured by DuPont) and a screw ring 4. A male thread is cut on the outside surface of the screw ring 4. Further, the screw ring 4 is threaded into the counterbored stage portion 1B, on the inside surface of which a female thread is cut. The Delrin ring 3 is made of a synthetic resin and is pressed by the screw ring 4 upon the entire peripheral part of the surface 2A of the optical element 2. Thereby, the optical element 2 is fixed to the optical element holder 1.

Figure 10:
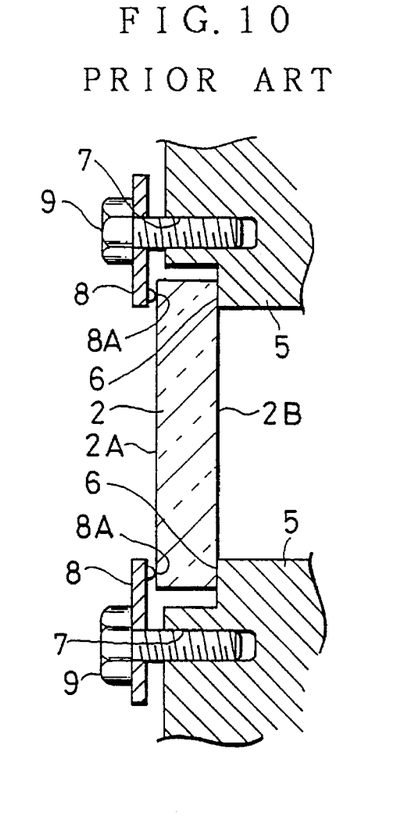
FIG. 10 is a sectional side view of a second example of a conventional optical element holder.

Referring next to FIG. 10, there is shown a second example of a conventional optical element holder. In this figure, reference numeral 5 denotes a holding portion in which a fitting stage portion 6 for supporting the optical element 2 fitted thereto is provided. Three tapped holes 7 are formed in the peripheral part of the fitting stage portion 6. A fixing bolt 9 supporting a fixing plate 8 is screwed into each of the tapped holes 7. The fixing plate 8 is shaped like a flat plate. Further, a hemispherical supporting projection 8A is provided at an end of the fixing plate 8 and supports the optical element 2 at a point thereof fixedly by being put into abutting engagement therewith. The front surface 2A and the back surface 2B of the optical element 2 are securely supported by the fixing plate 8 and the fitting stage portion 6, respectively. Thus, the optical element 2 is firmly placed between the fixing plate 8 and the fitting stage portion 6. Consequently, the optical element 2 is held on the holding portion 5, with certain profile irregularity (or figure tolerance) of the optical element being maintained.

Additionally, in the case of a third example (not shown) of a conventional optical element holder, an optical element 2 is glued with adhesives directly onto both of a counterbored stage portion 1B of an optical element holder 1 and a fitting stage portion 6 of a holding portion 5 thereof.

The aforementioned examples of the conventional optical element holder, however, have the following drawbacks, respectively.

In the case of the first example of the conventional optical element holder, the optical element 2 is secured to the optical element holder 1 by the screw ring 4 through the Delrin ring 3. It is, however, difficult to maintain the profile irregularity (or fine figure tolerance) of a surface of the screw ring 4, on which the Delrin ring 3 is put into abutting engagement therewith, small. This results in that the pressing force of the screw ring 4, with which the surface 2A of the optical element 2 is pressed, becomes uneven. Consequently, a strain occurs in the surface 2A of the optical element 2. Therefore, the first example of the conventional optical element holder has a drawback in that the profile irregularity (or figure tolerance) of the optical element 2 can not be maintained small.

Figure 11:
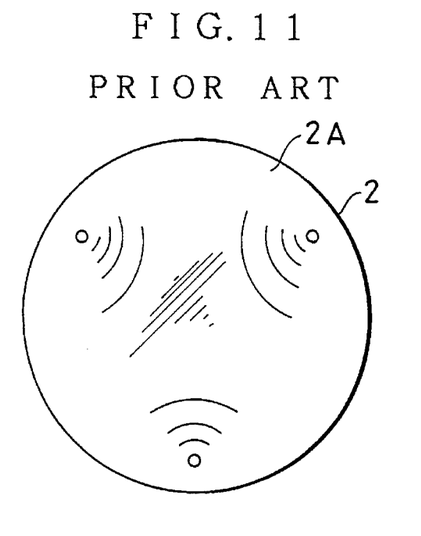
FIG. 11 is a front view of a surface of an optical element held by the conventional optical element holder of FIG.

Further, in the case of the second example of the conventional optical element holder, the supporting projection 8A of the fixing plate 8 is put into direct abutment engagement with the surface 2A of the optical element holder 2 to thereby support the holder 2. Thus the supporting protection sometimes has an adverse effect upon the surface 2A of the holder 2. Practically, if the optical element 2 is fastened to the holding portion 5 with the fixing bolts 9 too tightly, distortions occur in the surface 2A of the optical element 2 around a portion of each of the supporting projections 8A, which is in abutting engagement with the surface 2A, as illustrated in FIG. 11. Consequently, the second example of the conventional optical element holder also has a drawback in that the profile irregularity (or figure tolerance) of the optical element 2 can not be maintained small.

Moreover, in the third example of the conventional optical element holder, the optical element 2 is glued with adhesives onto the optical element holder 1. However, there occur expansion and shrinkage in a portion of the surface 2A of the optical element 2, to which the adhesive is applied. Consequently, the expansion and shrinkage result in deformation of the surface 2A of the optical element 2. Therefore, the third example of the conventional optical element holder also has a drawback in that the profile irregularity (or figure tolerance) of the optical element 2 can not be maintained small.

The present invention is accomplished to eliminate the drawbacks of the conventional optical element holder.

Accordingly, an object of the present invention is to provide an improved optical element holder, by which an optical element can be securely held with maintaining the profile irregularity (or figure tolerance) of the optical element small, and from which the optical element can be easily detached.

SUMMARY OF THE INVENTION

To achieve the foregoing object, in accordance with the present invention, there is provided an optical element holder for holding an optical element having a peripheral side surface and at least one surface which is operative to perform what is called an optical function (namely, is operative to act on light). This optical element holder holds the optical element in such a manner as to maintain the profile irregularity (or figure tolerance) thereof small. This optical element holder is characterized by comprising three holding portions which are put into abutting engagement with the peripheral side surface of the optical element at three places, respectively, to thereby hold the optical element, and characterized in that one of the holding portions is of the movable type that is adapted to move to and away from the peripheral side surface of the optical element so as to attach the optical element to and detach the optical element from the holder.

In the case of this optical element holder, when attaching the optical element thereto, the holding portion of the movable type is moved away from the optical element to increase the interval between the holding portion of the movable type and each of the other holding portions. Then, the optical element is fitted or inserted among the three holding portions. Subsequently, the holding portion of the movable type is moved close to and is thus brought into abutting engagement with the peripheral side surface of the optical element. Thereby, the optical element can be securely held by the holding portion of the movable type and the other holding portions. When detaching the optical element from the holder, the holding portion of the movable type is moved away from the optical element to increase the interval between the holding portion of the movable type and each of the other holding portions. Subsequently, the optical element is taken out from among the three holding portions.

Further, in the case of a practical embodiment of the aforementioned optical element holder of the present invention, the holding portion of the movable type is shaped like a cone and is supported in such a manner as to be able to slide in a direction tangential to the optical element to be attached to the holder.

Thus, the holding portion of the movable type is moved to and away from the peripheral side surface of the optical element by being slid in the direction tangential to the optical element. Then, the optical element is attached to and detached from the holder.

As above described, in the case of the optical element holder of the present invention, at least one of the holding portions is of the movable type. The optical element is attached to and detached from the holder as a result of moving the holding portion of the movable type to and away from the peripheral side surface of the optical element. Thereby, the optical element can be easily attached to and detached from the holder with maintaining the profile irregularity of the optical element small. Moreover, the optical element can be securely held in the holder.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, the preferred embodiment of the present invention will be described in detail by referring to the accompanying drawings.

Figure 1:
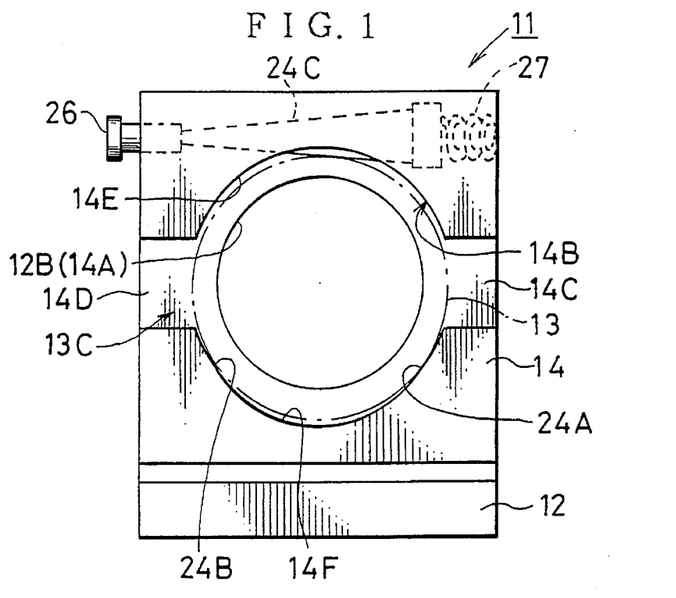
FIG. 1 is a front view of an optical element holder embodying the present invention.
Figure 2:
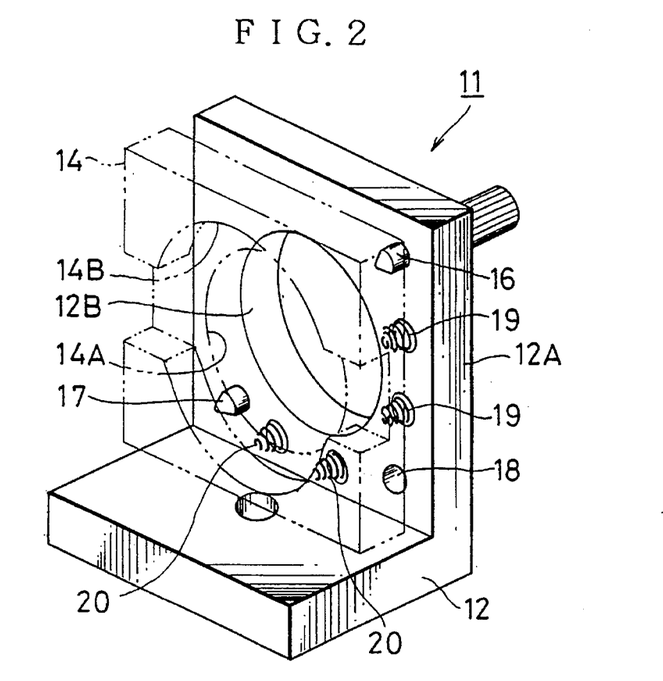
FIG. 2 is a perspective view of the optical element holder of FIG. 1.

As shown in FIGS. 1 and 2, an optical element holder 11 embodying the present invention consists mainly of a base portion 12 and a holding plate portion 14 for holding a nearly-disk-like optical element 13, for instance, a resonator mirror and a lens or the like.

The side surface of the base portion 12 is shaped like a letter "L". Further, a through hole 12B, through which an optical axis (not shown) extends, is bored through the central part of a vertical plate portion 12A. Two adjusting screws 16 and 17 are provided on both sides of or across this through hole 12B. A ball supporting hole is bored in a corner portion of a vertical plate portion 12A (namely, a lower right portion thereof, as viewed in FIG. 2). Two springs 19 or 20 are provided between this ball supporting hole 18 and each of the adjusting screws 16 and 17. Each of the springs 19 and 20 securely engages with a holding plate portion 14 at a tip end thereof and is supported by the vertical plate portion 12A at a base end part thereof. A ball supporting hole (not shown) similar to the hole 18 is bored through the holding plate portion 14 at a position facing the ball supporting hole 18. A supporting ball (not shown) is provided or inserted between the ball supporting hole bored in the holding plate portion 14 and the hole 18 bored in the vertical plate portion 12A. Thus, the holding plate portion 14 is drawn by each of the springs 19 and 20 close to the vertical plate portion 12A and is also supported at three positions, namely, supported by the supporting ball and the two adjusting screws 16 and 17. Further, the holding plate portion 14 is rocked about the supporting ball by appropriately turning each of the adjusting screws 16 and 17, thereby performing the fine adjustment of the optical element 13.

The outward form of the entire holding plate portion 14 is an approximately quadrangular plate. Further, a through hole 14A, the diameter of which is equal to that of the through hole 12A, is bored in the central portion of the holding plate portion 14. A counterbored stage portion 14B, the diameter of which is larger than that of the through hole 14A, is formed in an outer side of the holding plate portion 14 (namely, in the right-hand side thereof, as viewed in FIG. 2). The counterbored stage portion 14B is vertically divided by notches 14C and 14D respectively formed at both sides thereof into two parts thereof. Further, three holding portions 24A, 24B and 24C for holding the peripheral side surface 13C of the optical element 13 at three places (see FIG. 3) are provided on the inner surfaces 14E and 14F of the two parts of the counterbored stage portion 14B. These holding portions 24A, 24B and 24C are put into abutting engagement with the peripheral side surface 13C of the optical element 13 at the three places, respectively, so as to support the optical element 13 thereat. Among these three holding portions 24A, 24B and 24C, the holding portions 24A and 24B are formed on the lower inner surface 14F, respectively. These holding portions 24A and 24B are formed by combining two cylindrical counterbored stage portions. Practically, as illustrated in FIG. 4, a cylindrical counterbored stage portion of a larger diameter R is first formed in the holding plate portion 14. Thereafter, another cylindrical counterbored stage portion of a smaller diameter r is formed as illustrated in this figure. Consequently, the holding portions 24A and 24B are ridges formed on the lines of intersection of these cylindrical counterbored stage potions (corresponding to the points of intersection of a circle of a larger diameter R and another circle of a smaller diameter r, respectively, as illustrated in this figure).

At least one of the three holding portions is of the movable type (in this case, the holding portion 24C is of the movable type). Further, the optical element 13 can be detached from and attached to the holder by moving the holding portion 24C to and apart from the peripheral side surface 13C of the optical element 13. Practically, as illustrated in FIG. 1, this holding portion 24C is shaped like a cone and is provided in such a manner as to be able to slide in the holding plate portion 14 in a direction tangential to the optical element 13. In this figure, reference numeral 26 designates a push button portion attached to a tip end of the holding portion 24C (namely, to the left end thereof as viewed in this figure). The holding portion 24C is moved in a direction (namely, to the right, as viewed in FIG. 1) by pushing this push button 26. Reference numeral 27 denotes a spring attached to a base end of the holding portion 24C (namely, at the right end thereof, as viewed in FIG. 1). The holding portion 24C is pressed by this spring 27 in the opposite direction (namely, to the left, as viewed in FIG. 1).

Figure 3:
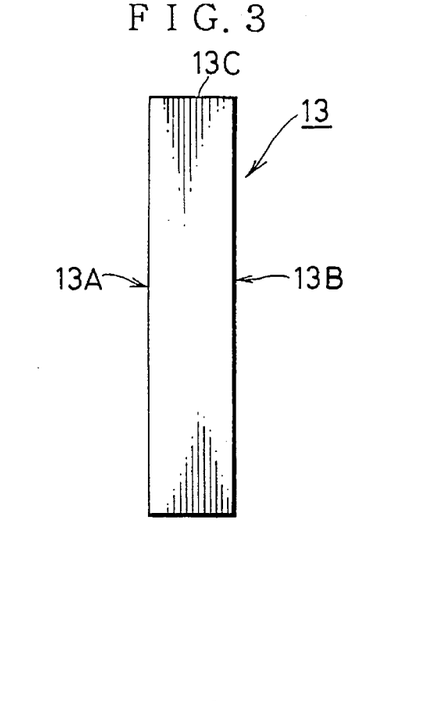
FIG. 3 is a side view of an optical element.
Figure 4:
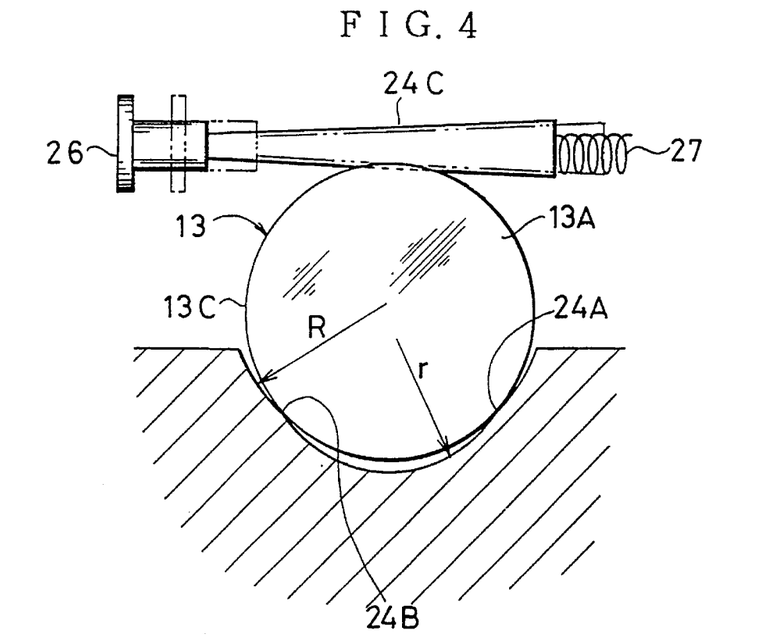
FIG. 4 is a diagram for illustrating how the optical element of FIG. 3 is supported in the optical element holder of FIG. 1.

As illustrated in FIGS. 3 and 4, the entire optical element 13 is shaped like a disk. Further, the optical element 13 has surfaces (hereunder sometimes referred to simply as optical function surfaces) 13A and 13B, which perform an optical function (or act upon light), and the peripheral side surface 13C. Incidentally, in the case where the optical element 13 is a mirror, only one of the surfaces 13A and 13B serves as an optical function surface. Further, in the case where the optical element 13 is a lens, each of the surfaces 13 and 13B serves as an optical function surface.

The entire peripheral side surface 13C of the optical element 13 is shaped like a smooth surface. The movable type holding portion 24C is put into abutting engagement with the smooth peripheral side surface 13C. Namely, while the peripheral side surface 13C of the optical element 13 is put into abutting engagement with the other holding portions 24A and 24B, the cone-like holding portion 24C is also brought into engagement with the peripheral side surface 13C thereof. Thereby, the optical element 13 is securely held by the holding plate portion 14 at three places thereof. Consequently, this prevents an occurrence of displacement in the direction of and in each direction perpendicular to the optical axis.

In the optical element holder 11 constructed as above described, the optical element 13 comes to be held after going through the following process.

First, the holding portion 24C is rightwardly moved to a position indicated by two-dot chain lines in FIG. 4 by pushing the push button 26. Thereby, the interval between the holding portion 24C and each of the holding portions 24A and 24B increases. Thus the optical element 13 is inserted among the three holders 24A, 24B and 24C. As a result, the peripheral side surface 13C of the optical element 13 is put into abutting engagement with the lower holding portions 24A and 24B. Subsequently, when the push button 26 is released, the holding portion 24C is pushed back by the spring 27. Thereby, the holding portion 24C is leftwardly moved to a position indicated by solid lines in FIG. 4 and is thus brought into abutting engagement with the peripheral side surface 13C of the optical element 13. As a result, the holding portions 24A, 24B and 24C are put into abutting engagement with the peripheral side surface 13C at three places, respectively. Consequently, the optical element 13 is firmly held by the holding plate portion 14 at the three places.

Next, the fine adjustment of a direction perpendicular to (namely, a direction of a normal to) the optical function surface 13A of the optical element 13 is performed by using the adjusting screws 16 and 17 through the holding plate portion 14.

When detaching the optical element 13 therefrom, the push button 26 is pushed. Thereby, the interval between the holding portion 24C and each of the holding portions 24A and 24B increases. Thus the optical element 13 is taken out from among these holding portions 24A, 24B and 24C.

As described above, the optical element 13 can be securely held by the optical element holder 11 with maintaining the profile irregularity of the optical element 13 small, but without adversely affecting the optical function surfaces 13A and 13B. Further, the optical element 13 can be extremely easily detached from and attached to the optical element holder 11.

Figure 5:
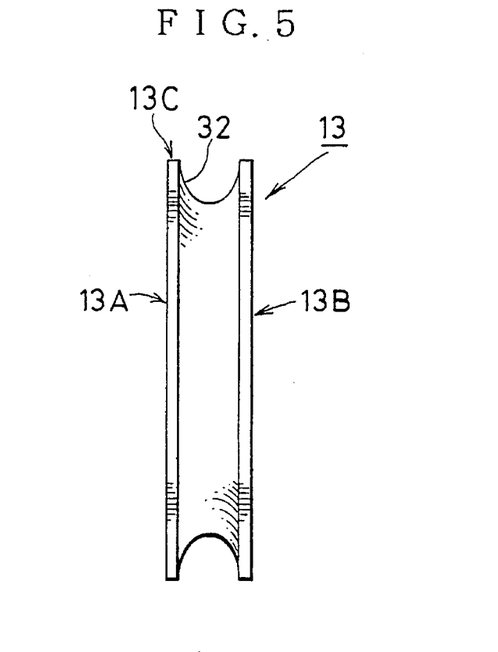
FIG. 5 is a side view of a first modification of the optical element of FIG. 3.

Incidentally, in the case of the aforementioned embodiment, the peripheral side surface 13C of the optical element 13 is shaped like a smooth surface. Instead of this, a U-shaped groove 32 may be formed around the entire peripheral side surface 18C thereof as illustrated in FIG. 5. In this case, the holding portion 24C of the movable type is fitted into the U-shaped groove 32. Namely, while the peripheral side surface 13C of the optical element 13 is put into abutting engagement with the other holding portions 24A and 24B, the cone-like holding portion 24C is fitted into the U-shaped groove 32. Thereby, the optical element 13 is securely held by the holding plate portion 14. Consequently, effects similar to those of the aforementioned embodiment can be obtained.

Figure 6:
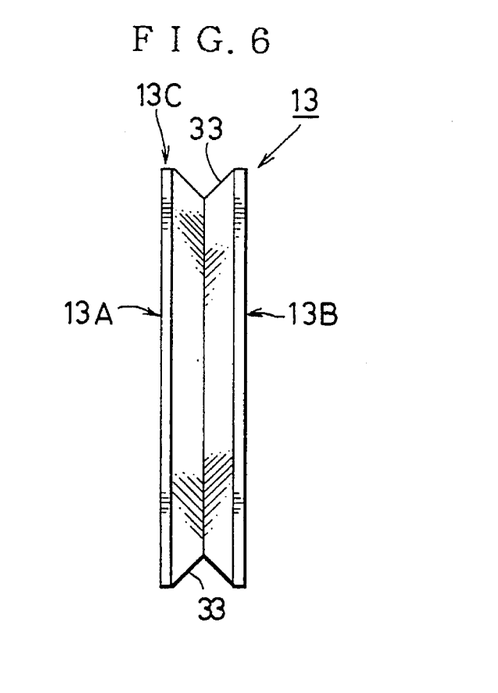
FIG. 6 is a side view of a second modification of the optical element of FIG. 3.

Further, as illustrated in FIG. 6, a V-shaped groove 33 may be formed around the entire peripheral side surface 13C of the optical element 13. In this case, similarly as in the case of employing the U-shaped groove 32, while the peripheral side surface 13C of the optical element 13 is brought into abutting engagement with the other holding portions 24A and 24B, the cone-like holding portion 24C is fitted into the V-shaped groove 32.

In these cases, each of the U-shaped groove 32 and the V-shaped groove 33 is provided around the entire peripheral side surface 13C of the optical element 13. Such a groove, however, may be provided only at a part of the surface 13C, which corresponds to the holding portion 24C of the movable type. In this case, effects similar to those of the aforementioned embodiment can be obtained.

Figure 7:
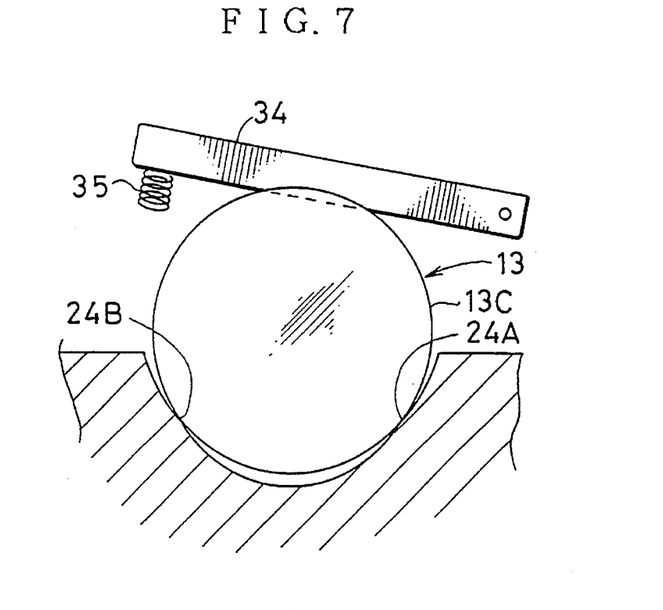
FIG. 7 is a schematic diagram for illustrating the configuration of a first modification of a holding portion of the movable type of FIGS. 1 and 4.

Moreover, in the case of the aforementioned embodiment, a cone-like member is used as the holding portion 24C of the movable type. Instead of this, a pivoting piece 34 pivotally movably supported on a pivot (not numbered), which is fixed to the holding plate portion 14, at an end thereof as illustrated in FIG. 7 may be used as the holding portion of the movable type. In this case, while the pivoting piece 34 is pivotally movably supported on the pivot at an end thereof, the other end of the piece 34 is pulled by a spring 35 fixed to the holding plate portion 14, thereby pressing the piece 34 against the optical element 13. While the peripheral side surface 13C of the optical element 13 is put into abutting engagement with the two lower holding portions 24A and 24B, a middle part of the pivoting piece 34 is brought into abutting engagement with the peripheral side surface 13C. Thereby, the optical element 13 is held in the holding plate portion 14. Consequently, even in this case, effects similar to those of the aforementioned embodiment can be obtained.

Figure 8:
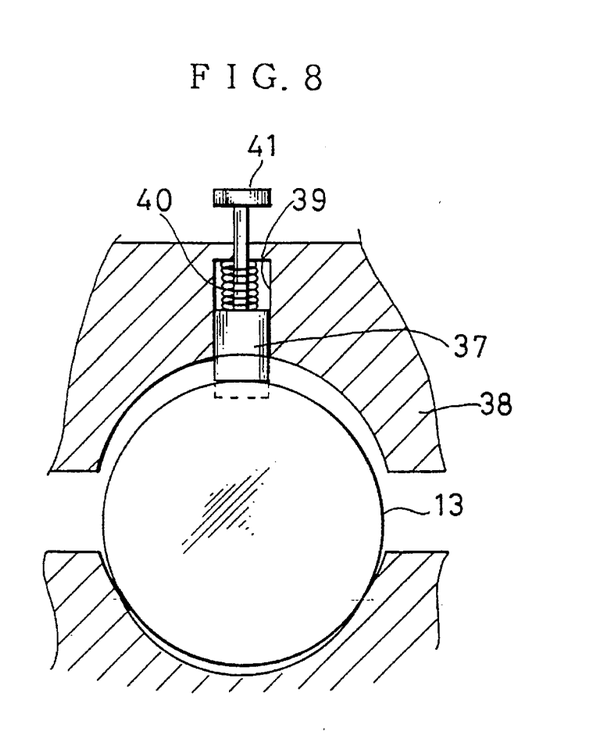
FIG. 8 is a schematic diagram for illustrating the configuration of a second modification of the holding portion of the movable type of FIGS. 1 and 4.

Furthermore, an engaging piece 37 adapted to slide in a direction of a radius of the optical element 13 as illustrated in FIG. 8 may be used as the holding portion of the movable type. This engaging piece 37 is slidably supported in a sliding hole 39 formed in an upper counterbored stage portion 38. The engaging piece 37 is pushed by a spring 40 against the optical element 13. In the case of moving the engaging piece 37 away from the optical element 13, a lever 41 is pulled. Even in this case, effects similar to those of the aforementioned embodiment can be obtained.

Additionally, in the case of each of the aforementioned embodiment and the modifications thereof, only a single holding portion of the movable type is provided in the optical element holder. However, two holding portions of the movable type may be provided therein.

Although the preferred embodiment of the present invention has been described above, it should be understood that the present invention is not limited thereto and that other modifications will be apparent to those skilled in the art without departing from the spirit of the invention.

The scope of the present-invention, therefore, is to be determined solely by the appended claims.

What is claimed is:

1. An optical element holder for holding an optical element having a peripheral side surface and at least one surface, which is operative to act upon light, in such a manner as to minimize profile irregularity of the optical element, the optical element holder comprising:

first, second and third holding portions that engage the peripheral sided surface of the optical element at first, second and third places, respectively, to thereby hold the optical element, wherein the first and second holding portions are fixed, and the third holding portion is movable and moves to and away from the peripheral side surface of the optical element to attach the optical element from the optical element holder, wherein the third holding portion is cone shaded and is supported in such a manner as to slide in a direction tangential to the optical element to attach to the optical element holder.

2. An optical element holder for holding an optical element having a peripheral side surface and at least one surface, which is operative to act upon light, in such a manner as to minimize profile irregularity of the optical element, the optical element holder comprising:

first, second and third holding portions that engage the peripheral side surface of the optical element at first, second and third places, respectively, to thereby hold the optical element, wherein the first and second holding portions are fixed and are formed by at least one intersection of a first arc and a second arc, a radius of the first arc being greater than a radius of the second arc, and the third holding portion is movable and moves to and away from the peripheral side surface of the optical element to attach the optical element to and detach the optical element from the optical element holder.

3. The optical element holder according to claim 2, wherein the third holding portion is cone shaped and is supported in such a manner as to be able to slide in a direction tangential to the optical element attached to the holder.

* * * * *